(12) United States Patent
Earl et al.

(10) Patent No.: US 12,258,887 B2
(45) Date of Patent: *Mar. 25, 2025

(54) COOLING GAS RECOVERED FROM A WELL

(71) Applicant: Sapphire Technologies, Inc., Cerritos, CA (US)

(72) Inventors: Jeffrey Earl, Hermosa Beach, CA (US); Archie Andonian, Huntington Beach, CA (US); Diego Guimaraes Ferreira, Fullerton, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,794

(22) Filed: Feb. 22, 2023

(65) Prior Publication Data

US 2024/0026803 A1     Jan. 25, 2024

Related U.S. Application Data

(63) Continuation-in-part of application No. 17/814,597, filed on Jul. 25, 2022.

(51) Int. Cl.
    *F01K 27/02*     (2006.01)
    *F01D 15/10*     (2006.01)
    (Continued)

(52) U.S. Cl.
    CPC ............. *F01K 27/02* (2013.01); *F01D 17/00* (2013.01); *F01D 17/16* (2013.01); *F01D 17/26* (2013.01);
    (Continued)

(58) Field of Classification Search
    CPC .... F25J 1/0052; B01D 19/0052; E21B 34/08; F02C 7/12; F02C 9/24; F25B 29/003
    (Continued)

(56) References Cited

U.S. PATENT DOCUMENTS 3,508,090 A     4/1970  Crampton et al.
3,667,215 A  *  6/1972  Rao ......................... F01K 27/00
                                                      60/526
(Continued)

FOREIGN PATENT DOCUMENTS

CN          103104812          5/2013
CN          105401990          3/2016
(Continued)

OTHER PUBLICATIONS

Giardinella et al., "Improve Energy Efficiency Using Expanders," Chemical Engineering, Apr. 1, 2021, 131(4):28-39.
(Continued)

*Primary Examiner* — Charles Reid, Jr.
(74) *Attorney, Agent, or Firm* — Fish & Richardson P.C.

(57) ABSTRACT

Flow from a gas well is conditioned prior to a production pipeline. A flow line is coupled to a gas well to receive the gas and coupled to a production pipeline to direct the received gas away from the production site, the flow line residing at a production site and comprising an electric power generation system. The electric power generation system has a turbine generator. The inlet nozzle and the turbine wheel of the turbine generator is configured to reduce the pressure and temperature of the received gas to conditions associated with the production pipeline.

13 Claims, 4 Drawing Sheets

(51) Int. Cl.
    *F01D 17/00*     (2006.01)
    *F01D 17/16*     (2006.01)
    *F01D 17/26*     (2006.01)
    *H02K 7/18*     (2006.01)
    *H02K 9/14*     (2006.01)

(52) U.S. Cl.
    CPC ............. *H02K 7/1823* (2013.01); *H02K 9/14* (2013.01); *F01D 15/10* (2013.01)

(58) Field of Classification Search
    USPC ...................................... 290/43, 54; 90/163
    See application file for complete search history.

(56) References Cited

U.S. PATENT DOCUMENTS

| | | | |
|---|---|---|---|
| 3,808,794 A | 5/1974 | Wood | |
| 3,895,243 A * | 7/1975 | Amend | H02K 44/08 |
| | | | 310/11 |
| 5,689,175 A | 11/1997 | Hanson et al. | |
| 5,924,847 A | 7/1999 | Scaringe et al. | |
| 6,073,447 A | 6/2000 | Kawakami et al. | |
| 6,378,330 B1 | 4/2002 | Minta et al. | |
| 6,560,988 B2 | 5/2003 | Kimble et al. | |
| 6,727,617 B2 | 4/2004 | McMullen et al. | |
| 6,751,985 B2 | 6/2004 | Kimble et al. | |
| 7,608,935 B2 * | 10/2009 | Scherzer | F03G 7/04 |
| | | | 290/43 |
| 7,638,892 B2 | 12/2009 | Myers | |
| 7,841,306 B2 | 11/2010 | Myers et al. | |
| 7,861,548 B2 | 1/2011 | Shibata et al. | |
| 7,966,840 B2 | 6/2011 | Shibata et al. | |
| 8,146,360 B2 | 4/2012 | Myers et al. | |
| 8,226,358 B2 | 7/2012 | Matsuo et al. | |
| 8,384,232 B2 | 2/2013 | Myers et al. | |
| 8,400,005 B2 | 3/2013 | Huber et al. | |
| 8,564,281 B2 | 10/2013 | Filatov | |
| 8,680,704 B1 * | 3/2014 | Rooney | F03B 13/02 |
| | | | 290/54 |
| 8,739,538 B2 | 6/2014 | Myers et al. | |
| 8,839,622 B2 | 9/2014 | Myers et al. | |
| 9,316,433 B2 | 4/2016 | Mak | |
| 9,568,242 B2 | 2/2017 | Mak | |
| 9,932,843 B2 | 4/2018 | Narehood et al. | |
| 10,280,796 B2 | 5/2019 | Dall'Ara et al. | |
| 10,815,882 B2 | 10/2020 | Marcucci et al. | |
| 10,895,165 B2 | 1/2021 | Son | |
| 11,280,169 B1 | 3/2022 | Bean et al. | |
| 11,781,530 B2 * | 10/2023 | Sharma | F03G 4/072 |
| | | | 60/641.5 |
| 2003/0014981 A1 | 1/2003 | Kimble et al. | |
| 2003/0177785 A1 | 9/2003 | Kimble et al. | |
| 2005/0217259 A1 | 10/2005 | Turchetta | |
| 2007/0000267 A1 | 1/2007 | Shibata et al. | |
| 2008/0246281 A1 | 10/2008 | Agrawal et al. | |
| 2008/0252077 A1 | 10/2008 | Myers | |
| 2009/0110485 A1 * | 4/2009 | Cripps | E02B 9/00 |
| | | | 405/75 |
| 2009/0126377 A1 | 5/2009 | Shibata et al. | |
| 2009/0165461 A1 | 7/2009 | Klassen et al. | |
| 2009/0220335 A1 | 9/2009 | Matsuo et al. | |
| 2010/0011809 A1 | 1/2010 | Mak | |
| 2010/0150713 A1 * | 6/2010 | Stankovic | F02C 3/14 |
| | | | 415/220 |
| 2010/0187822 A1 * | 7/2010 | Bivins | F01K 17/06 |
| | | | 60/39.12 |
| 2010/0237619 A1 | 9/2010 | Pozivil et al. | |
| 2010/0301840 A1 | 12/2010 | Filatov | |
| 2010/0314880 A1 * | 12/2010 | Cripps | F03B 7/00 |
| | | | 405/75 |
| 2011/0239701 A1 | 10/2011 | Kaart et al. | |
| 2011/0283702 A1 | 11/2011 | Huber et al. | |
| 2011/0289922 A1 | 12/2011 | Myers et al. | |
| 2012/0013125 A1 | 1/2012 | Myers et al. | |
| 2012/0090351 A1 | 4/2012 | Van De Lisdonk et al. | |
| 2012/0248786 A1 | 10/2012 | Madison | |
| 2013/0015669 A1 | 1/2013 | Favilli et al. | |
| 2013/0039740 A1 | 2/2013 | Hawkins | |
| 2013/0286591 A1 | 10/2013 | Myers et al. | |
| 2013/0300120 A1 | 11/2013 | Podrog | |
| 2013/0341929 A1 * | 12/2013 | Ho | F01K 25/08 |
| | | | 60/671 |
| 2014/0265328 A1 * | 9/2014 | Van Blerk | F03B 11/004 |
| | | | 290/43 |
| 2015/0204603 A1 | 7/2015 | Sheng et al. | |
| 2016/0187058 A1 | 6/2016 | Mak | |
| 2016/0230586 A1 | 8/2016 | King et al. | |
| 2016/0338225 A1 | 11/2016 | Joshi et al. | |
| 2016/0341014 A1 | 11/2016 | Flight et al. | |
| 2017/0292350 A1 | 10/2017 | Weflen | |
| 2018/0030855 A1 | 2/2018 | Dall'Ara et al. | |
| 2018/0171832 A1 | 6/2018 | Kubo et al. | |
| 2018/0195427 A1 * | 7/2018 | Pandit | F01N 3/2013 |
| 2018/0306109 A1 | 10/2018 | Marcucci et al. | |
| 2019/0055899 A1 | 2/2019 | Munevar et al. | |
| 2019/0101061 A1 | 4/2019 | DiBenedetto | |
| 2019/0153952 A1 | 5/2019 | Niergarth et al. | |
| 2019/0366803 A1 | 12/2019 | Harris | |
| 2020/0059179 A1 | 2/2020 | Pearson | |
| 2020/0124021 A1 * | 4/2020 | Reil | F03B 3/06 |
| 2021/0156308 A1 | 5/2021 | Jones | |
| 2022/0074653 A1 | 3/2022 | Hoffman | |
| 2022/0154568 A1 | 5/2022 | Fink et al. | |
| 2022/0195848 A1 | 6/2022 | Olson et al. | |
| 2022/0268143 A1 | 8/2022 | Fink et al. | |
| 2022/0268515 A1 * | 8/2022 | Nataraj | F25J 1/0037 |
| 2022/0286020 A1 | 9/2022 | Sharma | |
| 2024/0026851 A1 | 1/2024 | Earl et al. | |
| 2024/0027128 A1 | 1/2024 | Earl et al. | |

FOREIGN PATENT DOCUMENTS

| | | |
|---|---|---|
| EP | 2096264 | 9/2009 |
| GB | 2084653 | 4/1982 |
| JP | 2004303649 | 10/2004 |
| WO | WO 2010142698 | 12/2010 |
| WO | WO 2022076846 | 4/2022 |
| WO | WO 2023196589 | 10/2023 |
| WO | WO 2024072535 | 4/2024 |

OTHER PUBLICATIONS

International Search Report and Written Opinion in International Appln. No. PCT/US2023/028467, mailed on Apr. 25, 2024, 17 pages.

International Search Report and Written Opinion in International Appln. No. PCT/US2024/016867, mailed on Jun. 24, 2024, 13 pages.

International Search Report and Written Opinion in International Appln. No. PCT/US2024/016874, mailed on Jun. 14, 2024, 13 pages.

Ristanovic et al., "Turbo-Expander Generators for Supplemental Power Generation in LNG Liquefaction Plants," IEEE Transactions on Industry Applications, Dec. 2020, 56(6):6094-6103.

Sidorov et al., "Numerical Simulation of the Gas Expansion Process in a Turboexpander Unit by the Finite Volume Method," Thermal Engineering, Aug. 1, 2021, 68(8):604-611.

Maghon et al., "50-Hz Heavy Duty Gas Turbines—Experience and Evolution," Siemens Power Generation (PG), upon information and belief, available no later than Jun. 8, 2021, retrieved on May 20, 2022, 10 pages.

* cited by examiner

COOLING GAS RECOVERED FROM A WELL

CROSS-REFERENCE TO RELATED PATENT APPLICATIONS

This application is a continuation-in-part of and claims the benefit of priority to U.S. patent application Ser. No. 17/814,597, filed Jul. 25, 2022, the contents of which are incorporated by reference herein.

TECHNICAL FIELD

This disclosure relates to conditioning gas for a pipeline.

BACKGROUND

Natural gas is one of the principal sources of energy for many of our day-to-day needs and activities. Natural gas is an attractive fossil fuel for its abundance and relative cleanliness. It is produced from wells, typically in rural areas, away from national, regional, or municipal power grids and other ready sources of electricity. In the case of subsea natural gas wells, the well production is piped to offshore platforms far from populated areas. Thus, if electricity is needed at the production site (including offshore platform) it is typically made on site by burning a portion of the produced gas.

SUMMARY

In certain aspects, a system for conditioning flow from a gas well prior to a production pipeline includes an inlet flow line coupled to a wellhead of the gas well to receive gas produced from the gas well. A flow line is coupled to the inlet flow line to receive the gas and is coupled to the production pipeline to direct the received gas away from a production site. The flow line resides at the production site and includes an electric power generation system. The electric power generation system includes a turbine wheel configured to receive the gas and rotate in response to expansion of the gas flowing into an inlet of the turbine wheel and out of an outlet of the turbine wheel. A nozzle is configured to direct gas into the inlet of the turbine wheel. An electric rotor is coupled to the turbine wheel and configured to rotate with the turbine wheel within a stationary electric stator. The electric rotor and electric stator defining an electric generator configured to generate current upon rotation of the electric rotor within the electric stator. In certain instances, the turbine wheel is configured to reduce the temperature of the received gas at an inlet to the production pipeline to at least a specified temperature associated with the production pipeline. In certain instances, the turbine wheel can be configured to have an isentropic efficiency of 80% or lower at the conditions of the received gas.

In certain aspects, a method of conditioning a flow from a gas well for a production pipeline includes receiving flow from the gas well at a flow line. The flow line includes an electric power generation system residing on a production site of the well. The flow line includes a turbine wheel configured to receive the gas and rotate in response to expansion of the gas flowing into an inlet of the turbine wheel and out of an outlet of the turbine wheel. It also includes a nozzle configured to direct gas to the inlet of the turbine wheel. An electric rotor is coupled to the turbine wheel and configured to rotate with the turbine wheel within a stationary electric stator. The electric rotor and electric stator define an electric generator configured to generate current upon rotation of the electric rotor within the electric stator. In certain instances, a portion of the flow from the gas well is flowed through the flow line and the electric power generation system and, with the turbine, the temperature of the gas is reduced at an inlet to the production pipeline to at least a specified temperature associated with the production pipeline. In certain instances, a portion of the flow from the gas well is flowed through the flow line and the electric power generation system, with the turbine operating at an isentropic efficiency of 80% or lower.

In certain aspects, a system includes a flow path from a well to a pipeline having a nozzle and a turbine wheel coupled to a generator residing on a production site of the well. The nozzle and the turbine wheel are configured to reduce the temperature of gas received through the flow path to at least a specified temperature associated with the pipeline. In certain instances, the nozzle and the turbine wheel are configured to reduce the temperature of gas received through the flow path to no lower than a specified minimum temperature associated with the pipeline while operating at an isentropic efficiency of 80% or less.

The aspects above include some, all or none of the following features.

In certain instances, the turbine wheel is configured to have an isentropic efficiency of 80% or lower when both (i) reducing the pressure of the received gas, at an inlet to the production pipeline, to at least a specified maximum pressure associated with the pipeline and (ii) reducing the temperature of the received gas, at the inlet to the production pipeline, to no lower than a specified minimum temperature associated with the pipeline.

The isentropic efficiency of the turbine wheel can be selected based on the conditions of the received gas, the specified maximum pressure and the specified minimum temperature.

The turbine wheel can be configured to reduce the temperature of the received gas from a temperature higher than a specified maximum temperature associated with the pipeline to a temperature lower than the specified maximum temperature.

The nozzle and the turbine wheel can be configured to reduce the temperature of the received gas to no lower than a temperature at which hydrates form in the gas at an inlet of the pipeline.

In certain instances, the nozzle and the turbine wheel are configured to reduce the temperature of the received gas to 38° C. or lower.

The flow path between the turbine wheel and production pipeline can be provided without a heater.

The nozzle and the turbine wheel characteristics can be selected based on the specified minimum temperature of the pipeline to be above the specified minimum temperature over the operating life of the well.

A hermetically sealed housing can enclose the turbine wheel, the electric rotor and the electric stator and be hermetically sealed inline in the first mentioned flow line so that received flow flows through the turbine and over the electric stator.

A flow control valve can be provided in the flow line upstream of the electric power generation system.

In certain instances, a second flow line is coupled to the inlet flow line to receive the gas and provide an alternate flow path for the gas around the first mentioned flow line. The second flow line includes a pressure control valve, and the first mentioned flow line and the second flow line are coupled downstream of the electric power generation system to recombine flow from the first mentioned flow line and the second flow line. In certain instances, the nozzle and the turbine wheel are configured to, in cooperation with the pressure control valve in the second flow line, maintain a temperature of the received gas at an inlet to the production pipeline to be above a specified minimum temperature associated with the production pipeline while the well is producing gas above a specified maximum pressure associated with the production pipeline. The nozzle and turbine wheel can be configured to, in cooperation with the pressure control valve in the second flow line, maintain a pressure of the received gas at the inlet to the production pipeline to be below the specified maximum pressure associated with the production pipeline. In certain instances, the nozzle and the turbine wheel characteristics are selected to maximize the amount of power produced by the electric power generation system while, in cooperation with the pressure control valve in the second flow line, maintaining a temperature of the received gas at an inlet to the production pipeline above the specified minimum temperature while the well is producing gas above a specified maximum pressure associated with the production pipeline.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements. The drawings are not to scale.

DETAILED DESCRIPTION

Figure 1:
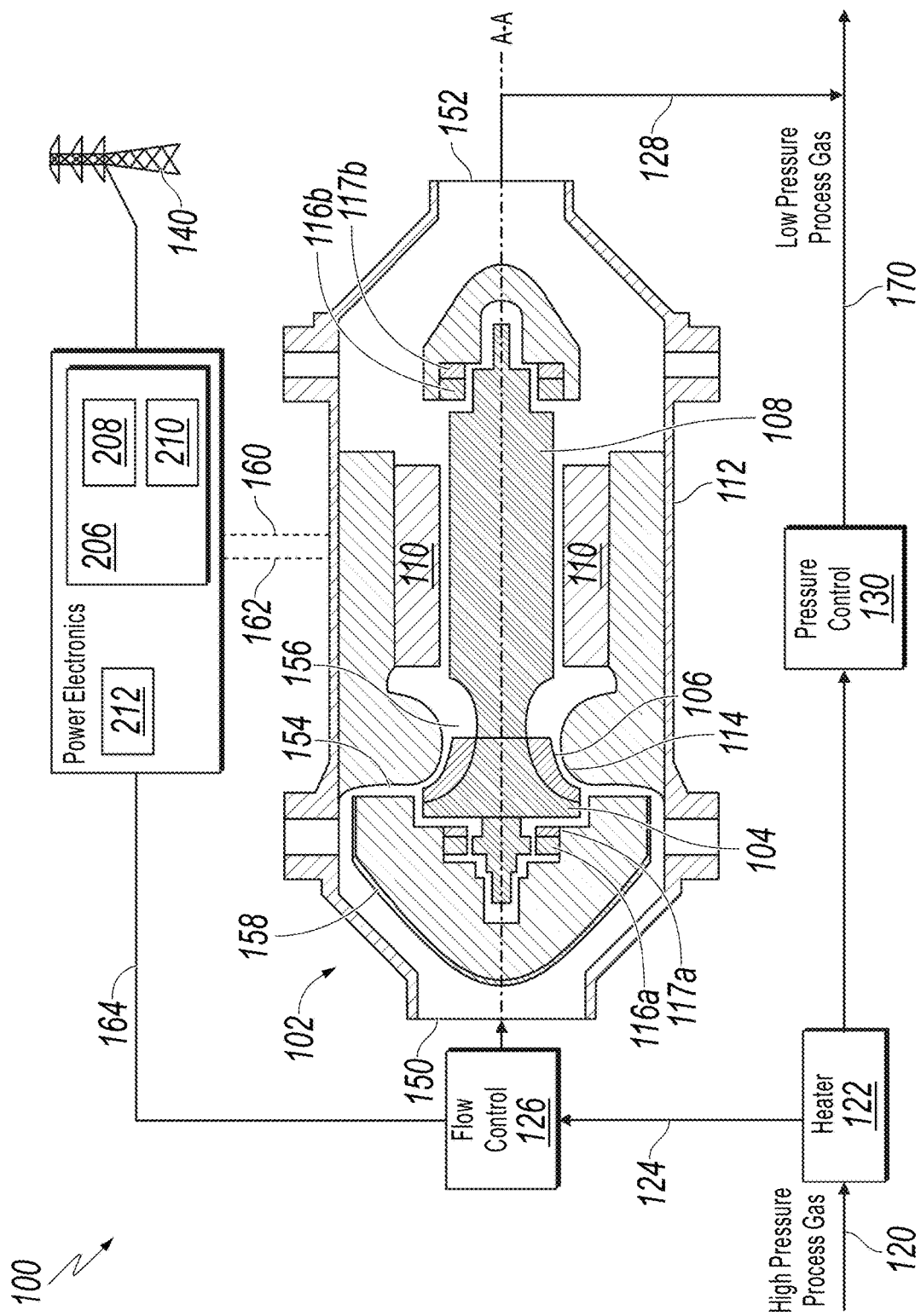
FIG. 1 is a schematic diagram of an electric power generation system in accordance with the concepts herein.

Natural gas wells produce at high pressure and temperature, sometimes as much as 9,000 PSIG (62.05 MPa) or even 15,000 PSIG (103.42 MPa) and at temperatures over 100° F. (38° C.) or even 150° F. (66° C.) and hotter. The pressure of the produced natural gas must be reduced prior to pre-processing, which separates particulates and moisture from the gas, and for transport via pipeline. Likewise, the temperature of the gas must be reduced to the operating temperature of the pipelines. The pipelines, for example, transport gasses from production sites (e.g., well sites) to processing facilities and from processing facilities to local distribution networks, such as regional, city or district networks or on site industrial plants networks.

The processes at the production sites and intermediate pressure letdown stations use pressure control valves (i.e., choke or throttle valves) to achieve the required pressure drops, but also waste significant amounts of head pressure energy in the process. Additional pressure control valves can be used at other locations for pressure control within the sub-processes of the processing facilities and within the end user's processes and piping. A chiller, and typically multiple chillers, are often used upstream of the pipeline (e.g., at the production site) to reduce the temperature of the gas produced to the operating temperature of the pipeline. Typical chillers include vapor-compression cycle type chillers and absorption chillers. In any case, the chillers consume power, and are often powered by a portion of the produced natural gas.

An energy recovery system, according to the concepts herein, can be used in lieu of or in combination with one or more of the above-mentioned pressure control valves to both control the pressure of the gas provided to the pipeline to the operating pressure of the pipeline and to reduce its temperature to the operating temperature of the pipeline. Use of such an energy recovery system can cool the gas, enabling eliminating or reducing the number of chillers (and associated power consumption) required to cool the gas for the pipeline. The energy recovery system can reside at the production site and/or elsewhere (e.g., at the intermediate pressure letdown station and other locations where the pressure control valves are used). The system includes a turboexpander (with a generator) that can be installed in-line in a flow line from the wellhead, often in parallel to a bypass flow line with a pressure control valve, to extract the wasted energy from pressure and temperature reduction and produce electrical power. The electrical power can be directed to a power grid or elsewhere. For example, some or all of the power can be used at the production site (onshore or offshore) to supply or offset the site's power needs, such as powering equipment at the production site. Some production sites, especially offshore platforms, have no other source of electric power than that made on site (e.g., by running natural gas powered generators off the produced gas or by diesel fueled generators). Thus, the energy recovery system can bring power to production sites and other remote locations without burning the produced gas and the resultant emissions. In each instance, by recovering lost energy from produced natural gas, the energy recovery system can generate electricity while also reducing $CO_2$ emissions, increasing overall plant efficiency, offsetting electrical costs, and generating additional revenue.

FIG. 1 is a schematic diagram of an electric power generation system 100 coupled to a power grid 140 in accordance with embodiments of the present disclosure. As discussed in more detail below, the grid 140 may be a municipal grid, a microgrid, or the system 100 may be directly coupled to one or more pieces of equipment powered by its output. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by converting kinetic energy to rotational energy from gas expansion through a turbine wheel 104 and generating electrical energy. For example, rotation of the turbine wheel 104 can be used to rotate a rotor 108 within a stator 110, which then generates electrical energy.

The turboexpander 102 includes a high-performance, high-speed permanent magnet generator with an integrated radial in-flow expansion turbine wheel 104 and low loss active magnetic bearings (AMBs) 116a,b. The rotor assembly consists of the permanent magnet section with the turbine wheel 104 mounted directly to the rotor hub. The rotor 108 is levitated by the magnetic bearing system creating a frictionless (or near frictionless) interface between dynamic and static components. The AMBs 116a,b facilitate a lossless (or near lossless) rotation of the rotor 108.

The turboexpander 102 includes a high-performance, high-speed permanent magnet generator with an integrated radial in-flow expansion turbine wheel 104 and low loss active magnetic bearings (AMBs) 116a,b. The rotor assembly includes the permanent magnet section with the turbine wheel 104 mounted directly to the rotor hub of the rotor 108. The rotor 108 is levitated by the magnetic bearing system, for example, at longitudinal ends (e.g., axial ends) of the rotor 108, creating a frictionless (or near frictionless) interface between dynamic and static components. The AMBs 116a,b facilitate a lossless (or near lossless) rotation of the rotor 108.

The turboexpander 102 is designed to have process gas flow through the system, which cools the generator section and eliminates the need for auxiliary cooling equipment. The power electronics 118 for the turboexpander 102 combines a Variable Speed Drive (VSD) 206 and Magnetic Bearing Controller (MBC) 212 into one cabinet, in some implementations. The VSD allows for a consistent and clean delivery of generated power from the turboexpander 102 to a power grid 140. For example, the VSD 206 regulates the frequency and/or amplitude of the generated current to match the grid and/or power requirements of its load. After expansion, the gas exits the turboexpander 102 along the same axial path for downstream processes.

The turboexpander 102 includes a flow-through configuration. The flow-through configuration permits process gas to flow from an inlet side of the turboexpander 102 to an outlet side of the turboexpander 102, where the inlet and outlet are centered on the same axis. Internally, the gas flows into a gas inlet nozzle 154 to a turbine wheel 104 and an axial gas outlet 156 from the turbine wheel 104. The gas then flows through the generator and out of the outlet 152, where the gas rejoins the gas pipeline 170. Generally, high pressure process gas 120, e.g. from a natural gas well, is directed to flow into the turboexpander 102 through a flow control system 126. The flow control system 126 includes a flow or mass control valve and an emergency shut off valve. In embodiments, the turboexpander housing 112 is hermetically sealed.

The high pressure process gas 120 is expanded by flowing through the turbine wheel 104, resulting in a pressure letdown of the process gas. Lower pressure process gas 128 exits the turboexpander 102. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional choke, can be installed in parallel to the turboexpander 102. The pressure control valve 130 can be used to control the pressure of the high pressure process gas 120 that flows in parallel to the turboexpander 102. Any excess high pressure process gas that is not directed into the turboexpander can be directed through the pressure control valve 130.

As the gas is expanded through the turbine wheel 104 it is cooled. That gas then flows through the electrical portion of the turboexpander 102, thus cooling the generator components (e.g., rotor 108, stator 110, and other components). Cooling the generator components also supplies heat to the gas flow exiting the turboexpander 102. In some embodiments, a heater 122 can heat the high pressure process gas 120 prior to flowing the gas into the turboexpander 102. For example, if the expansion of the gas through the turbine wheel 104 would lower the temperature of the process gas to a point where moisture in the gas freezes and/or process gas components condense at, or downstream of, the turbine wheel or at other downstream locations in the pipeline, the pressurized process gas 120 can be heated by heater 122 prior to flowing through the turboexpander 102. Heated high pressure process gas 124 can then be directed into the turboexpander 102. The heating of the process gas can prevent freezing moisture or component condensation as the gas expands and its temperature drops.

The turboexpander 102 includes a stationary aerodynamic stator. The aerodynamic stator is shown as the stationary components defining nozzle 154. Although shown converging to radial at the inlet of the turbine wheel 104, other configurations are within the scope of this disclosure, such as a nozzle converging to slanted or a curved shape. The nozzle 154 increases the gas velocity and directs the gas onto the turbine wheel 104 at a given angle. Both magnitude and direction of gas exiting from the nozzle 154 have an effect on the level of power generation. The nozzle 154 can, in certain instances, have multiple blades therethrough. The gas velocity exiting the nozzle 154 can be adjusted by selecting the number of blades, blade height and blade profile.

The turboexpander 102 includes a turbine wheel 104. The turbine wheel 104 is shown as a radial inflow turbine wheel, though other configurations are within the scope of this disclosure, such as an axial flow turbine. In this example, heated high pressure process gas 124 is received from an inlet conduit 150 of the housing 112 enters a nozzle 154 of the turbine wheel 104. In certain embodiments, the fluid flows through an inlet conduit 150 and is diverted by a flow diverter 158 to a nozzle 154 that directs the flow into the radial inflow of the turbine wheel 104. In the example turboexpander 102 of FIG. 1, the flow diverter 158 includes a cone-shaped nose that diverts the gas flow radially outward to the nozzle 154. The flow diverter 158 can be connected to or integrally formed with the bearing 116a and sensor 117a at the inlet side of the turboexpander 102 and the supports for this bearing 116a and sensor 117a surrounding the axial end of the rotor 108 at the inlet end of the turboexpander 102. After expanding, the lower pressure process gas exits the turbine wheel 104 from an axially oriented outlet 156 to outlet conduit 152 of the housing 112 at the outlet end of the turboexpander 102.

The turbine wheel 104 can be directly affixed to the rotor 108, or to an intermediate common shaft, for example, by fasteners, rigid drive shaft, welding, or other manner. For example, the turbine wheel 104 may be received at an axial end of the rotor 108, and held to the rotor 108 with a shaft. The shaft threads into the rotor 108 at one end, and at the other end, captures the turbine wheel 104 between the end of rotor 108 and a nut threaded on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the nozzle 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turboexpander may be optimized to reduce the leakage. In embodiments, the housing 112 is hermetically sealed to prevent process gases from escaping the nozzle 154 of the turbine wheel 104.

The shroud 114 may reside at a specified distance away from the turbine wheel blades 106, and the turbine wheel 104 position is controlled to maintain the shroud 114 at a specified distance away from the turbine wheel blades 106 during operation of the turboexpander 102 by using magnetic positioning devices, including active magnetic bearings and position sensors.

As mentioned above, the turboexpander 102 generates rotational motion from gas expansion through the turbine wheel 104, which in turn, reduces the pressure and temperature of the process gas 120 expelled at the outlet of the turbine wheel 104. The structures defining the nozzle 154 and the shroud 114 (collectively the aerodynamic stator), the turbine wheel 104, the aerodynamic characteristics of the surfaces leading up to the turbine wheel 104, and the aerodynamics of the other flow passages through the turboexpander 102 can be tuned based on inlet temperature, pressure and composition to control characteristics such as the power (rotational speed and/or torque) generated by the wheel and the pressure and/or temperature output from the turbine wheel 104. In other words, the configuration of the aerodynamic stator, the turbine wheel 104 and other surfaces can be used analogously to a process control device to meet pressure and temperature specifications downstream of the turboexpander 102, as well as other characteristics like dew point. Moreover, the aerodynamic stator, the turbine wheel 104 and other surfaces can be customized aerodynamically, without substantially affecting other configuration aspects of the turboexpander 102.

The turbine wheel 104 can be tuned by selecting the diameter of the turbine wheel, the shape and number of blades, the surface finish of the aerodynamic surfaces of the wheel (e.g., the blades and interstitial surfaces), whether the wheel is shrouded, and if shrouded the shroud shape, and, if unshrouded, the position of the blades relative to the shroud. The shroud 114 and inlet surfaces leading up to the turbine wheel 104 can be tuned by selecting the distance between the shroud 114 and blades of the turbine wheel 114 and shaping the effective nozzle created by the surfaces leading up to the turbine wheel 104 and shroud 114. The wheel, shroud and surfaces can be modeled using computational fluid dynamics (CFD) software and iteratively adjusted to achieve the desired characteristics, then constructed and tested, and if necessary, iteratively adjusted in CFD, constructed and tested one or more additional times, to produce the desired characteristics. For example, the aerodynamic stator, the turbine wheel 104, and the other aerodynamic pathways through the turboexpander 102 can be designed to prioritize the power produced by the turbine wheel 104, prioritize the pressure characteristics at the outlet of the turbine wheel 104 (and turboexpander housing 112), prioritize the temperature characteristics at the outlet of the turbine wheel 104 (and housing 112) and/or prioritize or balance one or more of these characteristics. In certain instances, the aerodynamic stator, the turbine wheel 104 and other surfaces can be configured to target specific isenthalpic efficiencies and isentropic efficiencies to control the outlet conditions of the turboexpander 102 relative to the gas supplied, and the desired power generation.

Bearings 116a and 116b are arranged to rotatably support the rotor 108 and turbine wheel 104 relative to the stator 110 and the shroud 114. The turbine wheel 104 is supported by the bearings 116a and 116b. In embodiments, the turbine wheel 104 may be supported in a cantilevered manner and bearings 116a and 116b may be located on one side of turbine wheel 104. In certain instances, one or more of the bearings 116a or 116b can include ball bearings, needle bearings, magnetic bearings, foil bearings, journal bearings, or other bearing types.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 212 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b are connected to the housing 112 directly or indirectly, and the position sensors 117a, 117b can detect axial and/or radial displacement of the rotor 108 and its connected components (e.g., turbine wheel 104) relative to the housing 112. The magnetic bearing 116a and/or 116b can respond to the information from the positions sensors 117a, 117b and adjust for the detected displacement, if necessary. The MBC 212 may receive information from the position sensor(s) 117a, 117b and process that information to provide control signals to the magnetic bearings 116a, 116b. MBC 212 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as the need for lubrication, lubrication systems, and bearing seals. In some instances, brush, labyrinth or other types of seals are used on both sides of the rotor 106 to help balance the axial thrust load.

The turboexpander 102 may include one or more backup bearings. For example, in the event of a power outage that affects the operation of the magnetic bearings 116a and 116b, bearings may be used to rotatably support the turbine wheel 104 during that period of time. The backup bearings may include ball bearings, needle bearings, journal bearings, or the like.

As mentioned previously, the turboexpander 102 is configured to generate electricity in response to the rotation of the rotor 108. In certain instances, the rotor 108 can include one or more permanent magnets coupled to the rotor 108, for example, on a radially outer surface of the rotor 108 adjacent to the stator 110. The stator 110 includes a plurality of conductive coils, for example, positioned adjacent to the magnet(s) on the rotor 108. Electrical current is generated by the rotation of the magnet(s) within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator coil. At any instant, the magnitude of the voltage induced in the coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 135 kilowatts (kW) of power at a continuous speed of 25,000 revolutions per minute (rpm) of the rotor 108. In embodiments, the turboexpander 102 can produce on the order of 315 kW at certain rotational speeds (e.g., on the order of 23,000 rpm).

In some embodiments, the design of the turbine wheel 104, rotor 108, and/or stator 110 can be based on a desired parameter of the output gas from the turboexpander 102. For example, the design of the rotor 108 and stator 110 can be based on an expected or desired pressure and/or temperature of the gas 120, 128 at the input of the turboexpander 102, output of the turboexpander 102, or both.

In the example system 100 of FIG. 1, the turboexpander 102 is coupled to power electronics 118. Power electronics 118 includes the variable speed drive (VSD) 206 (or variable frequency drive) and the magnetic bearing controller (MBC) 212 (discussed above).

The electrical output 160 of the turboexpander 102 is connected to the VSD 206, which can be programmed to specific power requirements. The VSD 206 can include an insulated-gate bipolar transistor (IGBT) rectifier 208 to convert the variable frequency, high voltage output from the turboexpander 102 to a direct current (DC). The rectifier 208 can be a three-phase rectifier for three-phase AC input current. An inverter 210 then converts the DC from the rectifier AC for supplying to the power grid 140 (or other load). The inverter 210 can convert the DC to 380 VAC-480 VAC at 50 to 60 Hz for delivery to the power grid. The specific output of the VSD 206 depends on the power grid and application. Other conversion values are within the scope of this disclosure. The VSD 206 matches its output to the power grid 140 by sampling the grid voltage and frequency, and then changing the output voltage and frequency of the inverter 210 to match the sampled power grid voltage and frequency.

The turboexpander 102 is also connected to the MBC 212 in the power electronics 118. The MBC 212 constantly monitors position, current, temperature, and other parameters to ensure that the turboexpander 102 and the active magnetic bearings 116a and 116b are operating as desired. For example, the MBC 212 is coupled to position sensors 117a, 117b to monitor radial and/or axial position of the turbine wheel 104 and the rotor 108. The MBC 212 can control the magnetic bearings 116a, 116b to selectively change the stiffness and damping characteristics of the magnetic bearings 116a, 116b as a function of spin speed. The MBC 212 can also control synchronous cancellation, including automatic balancing control, adaptive vibration control, adaptive vibration rejection, and unbalance force rejection control.

Figure 2:
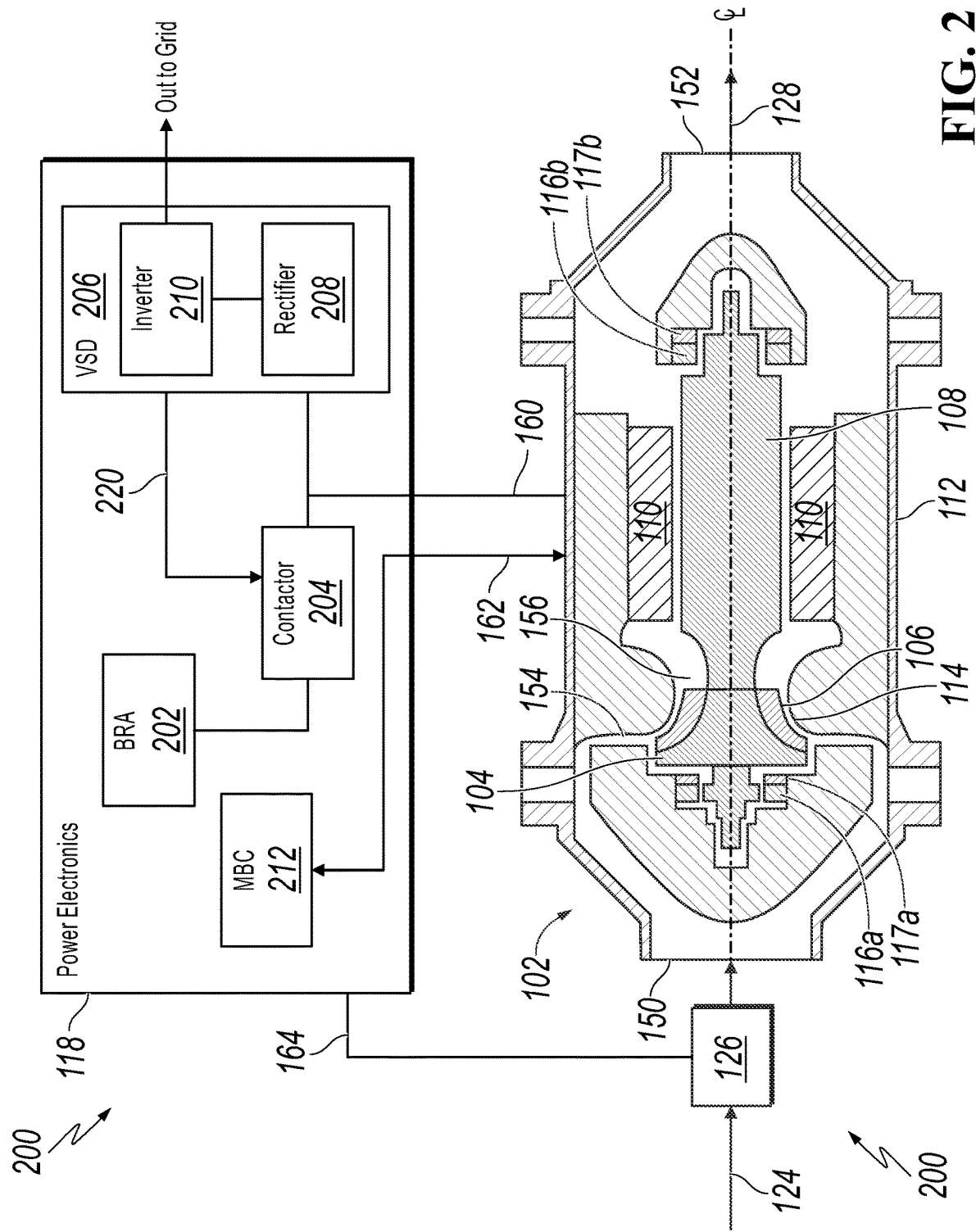
FIG. 2 is a schematic diagram of an example turboexpander system in accordance with the concepts herein.

FIG. 2 is a schematic diagram of an example turboexpander system 200 that includes a brake resistor assembly 202 in accordance with embodiments of the present disclosure. Turboexpander system 200 includes a turboexpander 102 and a power electronics 118. The turboexpander 102 receives a heated high pressure process gas 124, which causes a turbine wheel 104 to rotate. The rotation of the turbine wheel 104 rotates a rotor 108 that supports a plurality of permanent magnets. The rotation of the permanent magnets on the rotor 108 induces a current through coils or windings on stator 110.

The electric generator system acts as a brake on the rotor 108. This braking torque converts the shaft power, created by the process gas flow, to electrical power that can be put on an electrical grid, for example. In the case of a grid or load failure, inverter failure, or other fault condition, braking torque is lost and the rotor 108 may spin up towards an undesirable over speed. To prevent over speed, the power can be diverted to a brake resistor assembly 202 that can temporarily absorb the electricity until the process gas flow is reduced or removed (e.g., by flow control system 126) or until the fault condition is resolved. Flow control system 126 can include a one or a combination of a flow control valve or a mass control valve or an emergency shutoff valve. Flow control system 126 can be controlled by power electronics 118 or other electrical, mechanical, or electromagnetic signal. For example, a fault condition can signal the flow control system 126 to close or partially close, thereby removing or restricting gas supply to the turboexpander 102. Restricting or removing gas flow to the turboexpander reduces the shaft power developed by the turbine wheel and consequently, slows the rotor. In the example shown in FIGS. 1 and 2, a signal channel 164 from the power electronics 118 can be used to open and/or close the flow control system 126.

A fault condition can include a grid or load failure, VSD failure, inverter failure, or other fault condition. A fault condition can include any condition that removes or reduces the braking torque on the rotor 108.

A brake resistor assembly 202 is electrically connected to the electrical output 160 of the turboexpander 102 (e.g., the output of the generator). The brake resistor assembly 202 can have a tuned impedance to allow an efficient transfer of power from the turboexpander 102 to the brake resistor assembly 202.

In embodiments, a contactor 204 can connect the output current of the turboexpander 102 to the brake resistor assembly 202 when there is a fault condition at the VSD 206 or the power grid 140. The contactor 204 is an electrically controlled switch for switching in an electrical power circuit. The contactor 204 can accommodate the three-phase current output from the generator to direct the current to the brake resistor assembly 202.

In some embodiments, the contactor 204 is connected directly to the (three-phase) electrical output 160 of the turboexpander 102. In some embodiments, the brake resistor assembly 202 and/or the contactor 204 are not part of the power electronics, but are connected to the electrical output 160 of the turboexpander 102 outside of the power electronics 118.

The VSD 206 can provide an energizing signal 220 to the coil of the contactor 204 to cause the contactor 204 to connect the electrical output 160 of the turboexpander to the brake resistor assembly 202. Depending on the implementation choice, the contactor 204 can be a normally closed (NC) contactor or a normally open (NO) contactor.

For example, in an example implementation using a NO contactor, during normal operating conditions, the electrical output 160 of the turboexpander 102 is connected to the VSD 206 and supplies three-phase AC current to the VSD 206. In a fault condition, the VSD can energize the contactor 204 to connect the contactor 204 to the electrical output 160 of the turboexpander 102. In some implementations, the energizing signal 220 to the contactor 204 can be provided by another source that can respond to a fault condition (e.g., another component of the power electronics 118 or another component outside the power electronics 118). In this implementation, if failure of the VSD 206 is the cause of the fault condition, the contactor 204 can operate independent of the VSD 206.

If an NC contactor is used, then the VSD 206 (or other source) provides an energizing signal 220 to the contactor 204 to keep the contactor switches open during normal operating conditions. A fault condition can result in the removal of the energizing signal 220 to the contactor 204, which results in the contactor switches closing and completing the circuit between the electrical output 160 of the turboexpander 102 and the brake resistor assembly 202.

Figure 3:
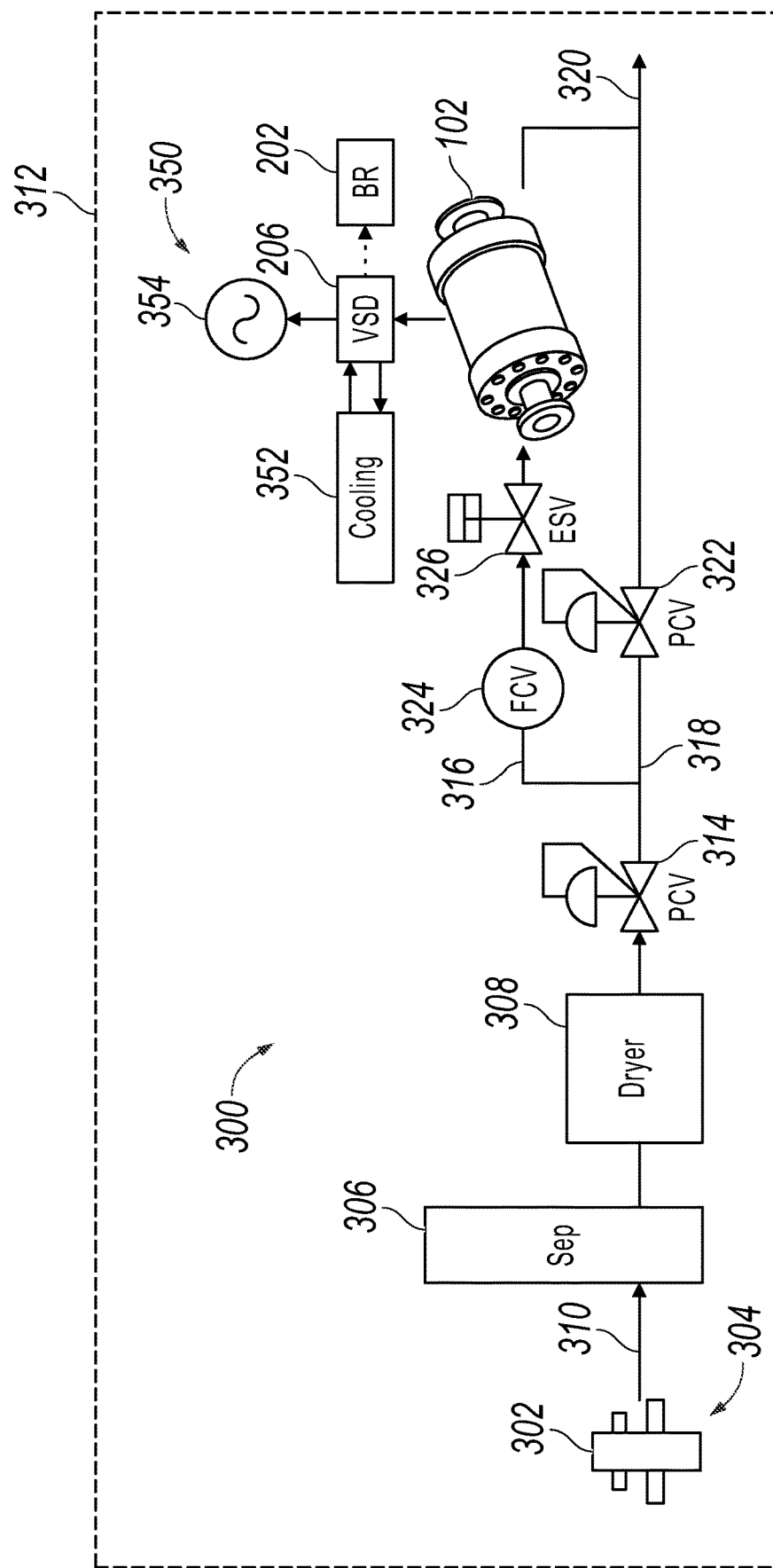
FIG. 3 is a schematic diagram of an example energy recovery system with an electric power generation system in accordance with the concepts herein.

FIG. 3 shows an example energy recovery system 300 coupled to and between a wellhead 302 of a well 304 and a production pipeline 320. The production pipeline 320 is the pipeline that communicates the produced fluids from the well 304 to one or more processing facilities (not show) and ultimately on to the end user. The system 300 includes an electric power generation system 350, with a turboexpander 102 (with generator), for recovering energy from reducing the pressure of the produced fluids from the well 304, as well as associated flow lines and other equipment. In certain instances, the system 300 resides at the production site 312, in proximity to the wellhead 302. In certain instances, the system 300 resides on or off the production site 312, upstream of the production pipeline 320. In one example of a land based well 304, the production site 312 is, and the system 300 resides on, the site with the other near well 304 equipment, upstream of the production pipeline 320. In another example, multiple land based wells 304 are on the same production site 312 feeding to the same pipeline 320, and the system 300 is coupled to one or more of the wells 304 and resides on the site 312. In certain instances, a production site can be half an acre (2,000 square meters) to two acres (8,000 square meters) in surface area. In one example of a subsea well 304, the production site 312 is, and system 300 resides on, a platform at the ocean surface. The platform can be a production platform corresponding to the well 304 (i.e., a subsea well), or it can be at a production platform associated with multiple of subsea wells 304, for example, where the wells 304 are manifolded to flow to a single production platform. In certain instances, the system 300 can reside on a dedicated platform apart from any production platform, and be coupled by a flow line to one or more other production platforms.

In certain instances, the electric power generation system 350 is the same as the electric power generation system 100. With reference to FIGS. 1 and 2, the system 350 includes, among other things of system 100, the above described turboexpander 102 in a hermetic housing 112, the electrical output of the generator of the turboexpander 102 being coupled to power electronics 118, including a VSD 206 with, in some instances, a brake resistor assembly 202. The turboexpander 102 can be configured to handle the gas conditions produced by the well 304, for example, configured to handle a specified amount of liquid in the gas, particulate in the gas, as well as to be resistant to corrosive aspects (e.g., hydrogen sulfide) in the gas. In certain instances, the VSD 206 can be coupled to a cooling system 352 to cool the electronics of the VSD 206 to maintain temperatures below a specified operating temperature. The output of the VSD 206 can be electrically coupled to a load 354, such as a power grid to supply power to the grid, as described above, a microgrid at the production site 312 for supplying power to equipment used for producing or treating gas at the production site 312, and/or directly to one or more pieces of equipment used for producing or treating gas at the production site 312 to supply power to the equipment. In certain instances, the equipment includes flow, pressure, temperature, and level sensors of various equipment, valve actuators, communications equipment for allowing remote communication with the sensors, other equipment and control of the valve actuators, separators (e.g., sand separators, liquid separators), heater treaters, site lighting, control trailers and/or other types of equipment. In certain instances, the electricity produced by the electric power generation system 350 can be used by other equipment at the production site 312 not involved in producing or treating the gas from the well 304. For example, the electricity can be used to power a hydrogen electrolyzer in a process on the production site 312 for producing hydrogen from the water.

The system 300 includes an inlet flow line 310 coupled to an outlet of the wellhead 302. Well production, that is primarily gaseous natural gas (but often also has some oil, water, moisture, and particulate), flows from the wellhead 302, and flows through flow line 310. The flow line 310 includes flow conditioning equipment to condition the flow to specified conditions selected based on the specification of pipeline 320 and equipment downstream of the production site 312, as well as based on the characteristics of the turboexpander 102 of the electric power generation system 350. In FIG. 3 the conditioning equipment is shown as a solids and liquids separator 306 and a dryer 308, but the conditioning equipment could include additional, different or fewer pieces and types of equipment. For example, the conditioning equipment can include separators, molecular dries, knock-out drums, two-phase coalescers and/or other types of conditioning equipment. Turning back to the specific example of FIG. 3, flow in flow line 310 flows from the wellhead 302 to and through the separator 306. In the separator 306, solids and liquids are separated from the gaseous flow. Thereafter, the flow flows through the flow line 310 to the dryer 308, where it is dried to reduce moisture in the flow to a specified level selected (in part or entirely) based on the specification of the turboexpander 102 of the electric power generation system 350. From the dryer 308, the flow flows through the flow line 310 to a pressure control valve 314. The pressure control valve 314 can be controlled to reduce the pressure of the gas flow to a specified pressure. Each of the valves herein, whether control or isolation or other, can be remote controlled, e.g., via an operator at a remote control board on the production site 312 or elsewhere or both, and/or autonomously controlled by a control algorithm of a controller residing at the production site 312 or elsewhere or both.

In the configuration of FIG. 3, flow from the pressure control valve 314 is split into a first downstream flow line 316 that includes an electric power generation system 350, including a turboexpander 102, and a second downstream flow line 318 that provides an alternate flow path around, i.e., bypasses, the turboexpander 102. The first downstream flow line 316 and second downstream flow line 318 recombine upstream of the production pipeline 320 and the remaining portion of the flow line 310 is coupled to the inlet of the production pipeline 320. In other instances, the second downstream flow line 318 can be omitted and the only path to the production pipeline 320 is through the electric power generation system 350. Flow into the production pipeline 320 leaves the production site 312. The inlet of the hermetic housing 112 is hermetically coupled in-line with first flow line 316 so that all fluid in the flow line 316 is directed into the hermetic housing 112, flows through the housing 112, and back into the remainder of first flow line 316. Often, a production pipeline (e.g., pipeline 320) will have been provided by and maintained by a different entity, a production pipeline operator, than that providing and maintaining the equipment at the production site.

When provided, the second flow line 318 includes a pressure control valve 322 (e.g., pressure control valve 130) configured with a specified pressure drop to actuation position correlation. The pressure control valve 322 can be controlled to regulate the pressure in the second flow line 318 downstream of the valve 322, and in turn (as a function of the pressure of the flow coming from the well) the pressure upstream of the pressure control valve 322 and the pressure in the first flow line 316. The first flow line 316 includes a flow control valve 324 (e.g., flow control valve 126), configured with a specified flow rate to actuation position correlation. The flow control valve 324 can be controlled in relation to the pressure control valves 314, 322 to control the flow rate of fluid flowing through the first flow line 316, and thus the flow rate of flowing through the turboexpander 102.

This arrangement provides the turboexpander 102 in parallel to the second flow line 318, and as will be discussed in more detail below, allows freedom in sizing the turboexpander 102 relative to the pressure and flow rate of flow produced from the well 304 as well as relative to the conditions of the pipeline 320. The freedom stems, in part, from the second flow line 318 allowing flow to selectively bypass the turboexpander 102 in flowing from the wellhead 302 to the production pipeline 320. In short, however, all flow need not pass through the turboexpander 102 in flowing from the wellhead 302 to the pipeline 320, so the turboexpander 102 need not be sized to receive all of the flow. The first flow line 316 also includes an emergency shut-off valve 326 upstream of the turboexpander 102 to quickly shut off flow to the turboexpander 102, if needed. When closed, the entirety of the flow flows through the second flow line 318. Notably, although not shown, the inlet flow line 310, first flow line 316 and second flow line 318 can additionally be instrumented with sensors to monitor the pressure, temperature, flow rate, and/or other characteristics of the flow in each line and upstream and/or downstream of each component (e.g., valves, turboexpander and other components in the flow lines).

In operation, when the well 304 is new and first put on production, the fluids produced from the well 304 are at or near their highest pressure and flow rate. Over the operating life of the well 304, the pressure of the produced fluids declines, as does the flow rate of the produced fluids until the well is no longer viable to operate. Thus, pressure of the production flow is regulated with the pressure control valve 314 in the flow line 310 to a specified pressure. The pressure control valve 322 in the second flow line 318 is, in turn, controlled to maintain the pressure through the first flow line 316 and through the turboexpander 102 so that together with the flow control valve 324 the conditions through the turboexpander 102 are maintained within the turboexpander's specified operating range. Excess flow exits the second flow line 318 and is directed to the pipeline 320. The flow through the first flow line 316 flows through the turboexpander 102, generating power, and then back to recombine with the flow from the second flow line 318 and on to the pipeline 320.

The characteristics of the turboexpander 102, including its turbine wheel 104 and other aerodynamic flow passages through the turboexpander 102, are selected based on a number of factors, including the expected pressures, temperatures and flow rates that can be maintained by the well 304 over time, the timeframe during the operating life of the well 304 that power generated by the turboexpander 102 is desired or needed (e.g., whether the power is needed at the outset of the well's life, over as much of the well's life as is feasible, or only at the tail of the well's life), the ambient conditions at the production site 312, the efficiency/performance of the solids and liquids separator 306 and dryer 308, the conditions, including pressure, temperature and/or flow rate, specified for receipt by the pipeline 320 (often specified by the pipeline operator), and the amount of electricity desired or needed to be produced at the production site 312 by the turboexpander 102. In certain instances, the characteristics of the turboexpander 102 (including the characteristics of the turbine wheel 104) can be selected based on the expected decline of the pressure of the well fluids, rather than the initial conditions of the fluids from the well 304. As discussed above, the characteristics of the turboexpander 102, for example, the turbine wheel 104 together with the other aerodynamic pathways through the turboexpander 102 can be designed to prioritize the power produced by the turbine wheel 104, prioritize the pressure characteristics at the outlet of the turbine wheel 104 (and turboexpander housing 112), prioritize the temperature characteristics at the outlet of the turbine wheel 104 (and housing 112) and/or prioritize or balance one or more of these characteristics.

The characteristics of the turboexpander 102 can be tuned by tuning the turbine wheel 104 design (as discussed above), as well as the design of the aerodynamic shapes and flow area of other aspects of the turboexpander 102 (e.g., by selecting the aerodynamic shape and area of the flow paths and nozzle to the turbine wheel and from the turbine wheel, through the electric rotor and stator to the outlet of the turboexpander 102). The specified pressure to which the pressure control valve 314 is controlled is, in turn, selected based on a number of factors, including the pressure, temperature and flow characteristics of the turboexpander 102, the amount of electricity desired or needed to be produced, as well as the pressure, temperature and/or flow rate, specified for receipt by the pipeline 320. For example, in certain instances, the pipeline 320 is configured to operate at a specified pressure. The turboexpander 102, which causes a pressure drop as it extracts energy from the flow, is configured to, alone or in cooperation with one or both of the pressure control valves 314, 322, produce a pressure at the inlet to the pipeline 320 (or upstream thereof, e.g., at the outlet of the turboexpander 102) that is equal (precisely or approximately) to the specified maximum pressure of the pipeline 320 while the well 304 is producing pressure greater than the specified pressure of the pipeline 320. In certain instances, the pipeline 320 also has a specified minimum and maximum temperature. For example, in certain instances, the specified minimum temperature can be a temperature selected to prevent freezing of condensate or hydrate formation in the gas. In certain instances, the specified maximum temperature is selected based on the temperatures the pipe and the equipment in the pipeline can withstand or are designed (e.g., rated) to withstand. Often, the specified pressures and temperatures are specified by the operator of the pipeline to the operators of the production sites supplying gas to the pipelines. The turboexpander 102, which causes a temperature drop as it extracts energy from the flow, is configured to, alone or in cooperation with one or both of the pressure control valves 314, 322 (which also cause a temperature drop), maintain a temperature at the inlet to the pipeline 320 (or upstream thereof, e.g., at the outlet of the turbine wheel 104 and valve 322) at or below the specified maximum pressure at or above the specified minimum temperature. The turboexpander 102 can also be configured to, alone or in cooperation with one or both of the pressure control valves 314, 322 (which also causes a temperature drop), maintain a temperature at the inlet to the pipeline 320 (or upstream thereof, e.g., at the outlet of the turbine wheel 104 and valve 322) at or below the specified maximum temperature.

In most instances, the turboexpander 102, alone or in cooperation with one or both of the control of valves 314, 322, can be configured to maintain the temperature to the pipeline 320 below the specified maximum temperature without needing a chiller, or other refrigeration or cooling, inline between the well 304 and the pipeline 320.

In certain instances, due to the conditions of the gas received by the turboexpander 102 and constraints on the energy recovery system 300, the pressure drop across the turboexpander 102 may result in a temperature at the inlet of the pipeline 320 that is higher than the specified maximum temperature of the pipeline 320. One or more chillers, or other refrigeration cycle, heat exchanger or cooling, can be provided in the energy recovery system 300 or elsewhere upstream of the inlet of the pipeline 320 to further reduce the temperature to or below the specified maximum temperature of the pipeline 320. But, due to the temperature drop produced by the energy recovery system 300, the number and/or capacity of the chillers (or other systems) can be lower than the number and/or capacity that would be required if no energy recovery system 300 or turboexpander 102 was provided.

In certain instances, for certain inlet conditions of the process gas 120 supplied to the turboexpander 102 and specified maximum pressure of the pipeline 320, the turboexpander 102 (e.g., aerodynamic stator defining the nozzle 154 and/or the turbine wheel 104) can be configured to have a high isentropic efficiency (e.g., 85-90%) to prioritize power production for a pressure drop across the turboexpander 102 sufficient to achieve, alone or in cooperation with one or both of the valves 314, 322, a pressure at the inlet to the pipeline 320 that is at or below the specified maximum pressure of the pipeline 320. The turboexpander 102 can be configured to prioritize power production over a specified period of the life of the well 304, such as for the majority of the life of the well 304, the entire or a majority of the time while the well 304 produces gas above a specified pressure (e.g., above the maximum specified pressure of the pipeline 320 or another pressure above or below the maximum specified pressure of the pipeline 320). Prioritizing power in this way may produce a large pressure drop across the turboexpander 102, but also cause a large temperature drop that, in some instances, may cause the temperature to drop below the specified minimum temperature of the pipeline 320 and/or produce freezing of condensate and hydrate formation in the turboexpander 102 and downstream. Thus, the specified temperature conditions of the pipeline 320 can be achieved, for example, by including one or more heaters (e.g., natural gas, electric and/or other type) in the energy recovery system 300 or otherwise upstream of the inlet of the pipeline 320 to heat the flow from the turboexpander 102 to the specified minimum temperature of the pipeline 320.

Alternately, the turboexpander 102 (e.g., the aerodynamic stator defining the nozzle 154 and/or turbine wheel 102) can be configured to have a lower isentropic efficiency at the received conditions of the gas, and outlet conditions described above, to extract less enthalpy from the gas, so that, for the same pressure drop, the outlet temperature of the turboexpander 102 is higher and the temperature at the inlet to the pipeline 320 is above the specified minimum temperature of the pipeline 320. The same strategy can be used to merely reduce the heating requirements upstream of the pipeline 320 as compared to a turboexpander with a turbine wheel optimized for power production, having an isentropic efficiency that may cause freezing or hydrate formation. In other words, in some instances, the aerodynamic stator and turbine wheel 104 can be configured to prioritize temperature to the pipeline 320 so that no heater/heating is required upstream or downstream of the turboexpander 102 when operated alone or in cooperation with one or both of the pressure control valves 314, 322, or so that the heater/heating is reduced from that required for a turboexpander 102 prioritized for power production. The turboexpander 102 can be configured to prioritize pressure to the pipeline 320 over a specified period of the life of the well 304, such as for the majority of the life of the well 304, the entire or a majority of the time while the well 304 produces gas above a specified pressure (e.g., above the maximum specified pressure of the pipeline 320 or another pressure above or below the maximum specified pressure of the pipeline 320). In certain instances, the lower isentropic efficiency can be less than 85% and, in certain instances, may be less than 80%, 75%, 70% or even 50%. Such a lower isentropic efficiency can be achieved by tuning the aerodynamic stator and the turbine wheel 104 as discussed above. For example, for a certain pressure drop across the turbine wheel 104 at the same inlet conditions, the turbine wheel 104 may have, as compared to a wheel with an 85-90% isentropic efficiency, additional blades, different shaped blades (e.g., less aerodynamically efficient), a greater surface roughness on the aerodynamic surfaces of the blades and interstitial surfaces between the blades, and/or the blades or aspects of the wheel being sized to achieve a larger gap between the blade tips and the surrounding shroud. In other words, by reducing the isentropic efficiency of the turbine wheel 104, the wheel can be configured to prioritize, for a certain pressure drop, the temperature to the inlet of the pipeline 320 (or upstream thereof, e.g., at the outlet of the turbine wheel 104, the turboexpander 102 or electric power generation system) being above a specified minimum temperature of the pipeline 320 over power produced by the wheel for that same pressure drop. In some instances, the aerodynamic stator can be adjusted to modify the velocity and direction of gas entering the turbine wheel 104. Such an adjustment can reduce the aerodynamic efficiency and increase the temperature to the inlet of the pipeline 320, without affecting the pressure drop. The same strategy can be used to merely reduce the heating requirements over a system not so prioritized.

In yet another configuration, the turboexpander 102 (e.g., the aerodynamic stator defining the nozzle 154 and/or turbine wheel 102) can be configured with an isentropic efficiency at the received conditions of the gas, and outlet conditions described above, to extract a specified enthalpy from the gas to balance power production and temperature to the pipeline 320. The configuration is such that, when used in combination with one or both of the pressure control valves 314, 322, the pressure to the pipeline 320 is reduced to or below the maximum specified temperature of the pipeline 320 and a specified (e.g., maximum or near maximum) amount of power is produced, while no heater/heating is required upstream or downstream of the turboexpander 102, or so that the heater/heating is reduced from that required for a turboexpander 102 prioritized for power production. The turboexpander 102 can be configured to operate in this balanced state over a specified period of the life of the well 304, such as for the majority of the life of the well 304, the entire or a majority of the time while the well 304 produces gas above a specified pressure (e.g., above the maximum specified pressure of the pipeline 320 or another pressure above or below the maximum specified pressure of the pipeline 320). As above, the lower isentropic efficiency can be less than 85% and, in certain instances, may be less than 80%, 75%, 70% or even 50%, and can be achieved by tuning the aerodynamic stator and the turbine wheel 104.

Providing a numerical example, in certain instances, the pressure of the well can be initially 9,000 PSIG (62.05 MPa) or higher at a temperature of 150° F. (66° C.) and the flow is regulated down to 1,600 PSIG (11.03 MPa) using the pressure control valve 314. As the well 304 ages, and the pressure declines, this 1,600 PSIG (11.03 MPa) can be maintained until the well's pressure drops below 1,600 PSIG (11.03 MPa). While the well is above 1,600 PSIG (11.03 MPa), the turboexpander 102, which can be optimized to operate at peak design efficiency under the pressure, temperature and flow conditions offered by the well 304 during this time, operates to generate electricity, while also providing and maintaining a further pressure drop at the inlet to the pipeline 320 (or downstream of the turboexpander 102) to the specified pressure of the pipeline 320. The turboexpander 102 can also, or alternatively, be optimized, alone or in cooperation with one or both of the control valves 314, 322, to provide a temperature at the inlet to the pipeline (or downstream of the turboexpander 102) at or below the specified maximum temperature of the pipeline 320 while also maintaining the temperature at or above the specified minimum temperature of the pipeline 320. In any instance, the hotter the well, the more energy there is available for the turboexpander 102 to extract for the same gas flow rate and minimum temperature and pressure requirements in the pipeline 320. As the well 304 pressure drops below 1,600 PSIG (11.03 MPa), the efficiency of the turboexpander 102 drops off until the well conditions can no longer operate the turboexpander 102 sufficiently. Thereafter, the first flow line 316 is shut off and flow is directed through only the second flow line 318, so that the turboexpander 102 does not provide an additional pressure drop. In certain instances, the turboexpander 102 is configured to produce usable amounts of electricity until the pressure upstream approaches the pipeline's specified pressure. Often times, this specified pressure is 1,000 PSIG (6.89 MPa).

Figure 4:
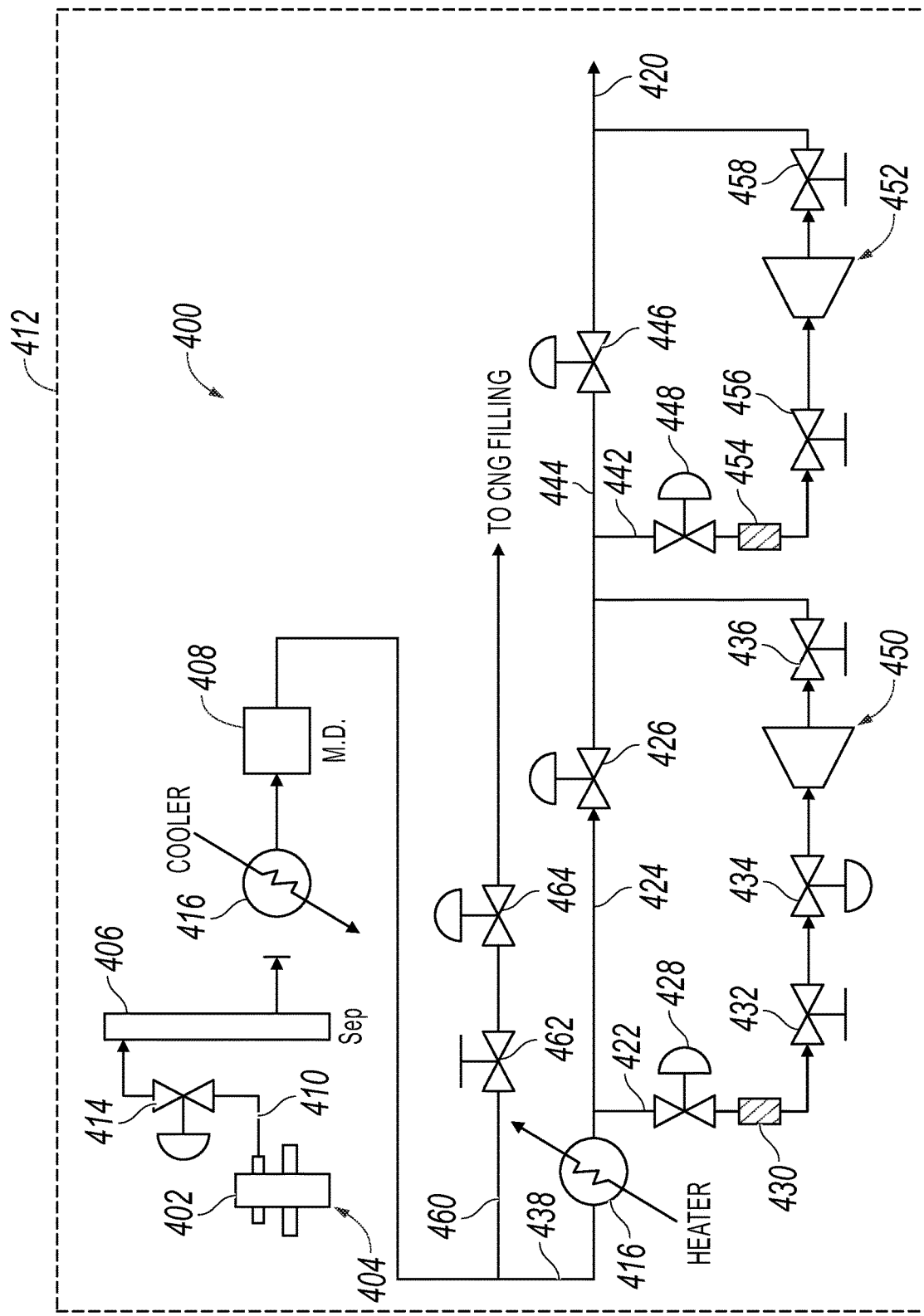
FIG. 4 is a schematic diagram of another example energy recovery system with two electric power generation systems in accordance with the concepts herein.

FIG. 4 is another example energy recovery system 400 coupled to and between a wellhead 402 of a well 404 (or multiple wells, in some cases) and a production pipeline 420. This second example energy recovery system 400 is more full featured than the example energy recovery system 300 discussed with respect to FIG. 3. For example, this second example energy recovery system 400 is shown with two electric power generation systems 450, 452, each configured like energy recovery system 350. As with system 300, this second example system 400 resides at the production site 412 (land based or offshore platform), in proximity to the wellhead 402 and/or upstream of the production pipeline 420. In certain instances, one or both of the electric power generation systems 450, 452 are the same as the electric power generation system 100. But, as will be discussed in more detail below, the electric power generation systems 450, 452 can have the same or different operational characteristics from one another.

The system 400 includes an inlet flow line 410 coupled to the outlet of the wellhead 402. The well production flows from the wellhead 402 into the flow line 410. As above, the flow line 410 includes flow conditioning equipment show in this instance as including a solids and liquid separator 406 and a dryer 408. The system 400 also is shown with a heat exchanger 416, the cool side of which is shown receiving the flow upstream from the dryer 408. Additional, different or fewer pieces and types of flow conditioning equipment may be provided. A pressure control valve 414 is shown between the wellhead 402 and the separator 406, but it could be elsewhere in the system upstream of the electric power generation systems 450, 452. After the dryer 408 the flow is split to a compressed natural gas (CNG) filling station line 460 leading to a CNG filling station and a production path line 438 leading to the inlet of the production pipeline 420.

The line 460 to the CNG filling station includes an isolation valve 462 and a pressure control valve 464. The isolation valve 462, when closed, seals the line 460 and allows the CNG filling station line 460 to be shut off so that all flow flows only to the production path line 460. The pressure control valve 464 allows the pressure to the CNG filling station to be regulated.

The production path line 438 has two electric power generation systems 450, 452. Flow enters this portion of the system passing through the hot side of the heat exchanger 416 to collect heat from (i.e., cool) the hotter flow upstream of the dryer 408. In FIG. 4, the flow is then split into a first flow line 422 that includes the electric power generation system 450 and a second flow line 424 that bypasses the electric power generation system 450. The first flow line 422 and the second flow line 424 converge downstream of the electric power generation system 450, upstream of the downstream electric power generation system 452. In other instances, the second flow line 424 can be omitted and the only path to the downstream electric power generation system 452 is through the first (upstream) electric power generation system 450. When provided, the second flow line 424 includes a pressure control valve 426 (e.g., pressure control valve 130). The first flow line 422 includes a flow control valve 428 (e.g., flow control valve 126) upstream of a flow meter 430. Thereafter, the first flow line 422 includes an isolation valve 432 that can be closed to cease flow into the first flow line 422 and the electric power generation system 450. The first flow line 422 also includes a pressure control valve 434. After the electric power generation system 450 an additional isolation valve 436 is provided to allow the electric power generation system 450 to be completely closed in and prevent backflow to the electric power generation system 450.

The flow is then split again into a third flow line 442 that includes the electric power generation system 452 and a fourth flow line 444 that bypasses the electric power generation system 452. The third flow line 442 and the fourth flow line 444 converge downstream of the electric power generation system 452, back into the production path line 438 which is coupled to the inlet of the production pipeline 420. In other instances, the fourth flow line 444 can be omitted and the only path to the production pipeline 420 is through the downstream electric power generation system 452. When provided, the fourth flow line 444 includes a pressure control valve 446 (e.g., pressure control valve 130). The third flow line 442 includes a flow control valve 448 (e.g., flow control valve 126) upstream of a flow meter 454. Thereafter, the third flow line 442 includes an isolation valve 456 that can be closed to cease flow into the third flow line 442 and the electric power generation system 452. After the electric power generation system 452 an additional isolation valve 458 is provided to allow the electric power generation system 452 to be completely closed in and prevent backflow to the electric power generation system 452.

While the two electric power generation systems 450, 452 can be identically configured, in certain instances, the turboexpanders and/or the electronics of the electric power generation systems 450, 452 can be differently configured. The same design considerations discussed above for the turboexpander of electric power generation system 350 and the pressure regulation by pressure control valve 314 (FIG. 3) can apply to the turboexpanders of the two electric power generation systems 450, 452 and pressure control valve 414, with the further caveat that the electric power generation system 450 can take into account the desired or needed inlet conditions for electric power generation system 452. For example, the turboexpander of the upstream electric power generation system 450 can be configured, and the pressure control valve 414 controlled, so that the conditions at the outlet of the turboexpander are within, and preferable at or near the upper limit of, the operating pressure range of the turboexpander of downstream electric power generation system 452. In certain instances, the turboexpander of the upstream electric power generation system 450 can be configured to handle and be more efficient than the turboexpander of the downstream electric power generation system 452 at higher pressures, temperatures and/or flow rates. Configuring the upstream turboexpander in this manner allows more ready use of the declining pressures produced by the well over its life. For example, in the embodiment of FIG. 3, when the pressure produced by the well 304 is greater than can be handled by the turboexpander of the electric power generation system 350, the pressures are regulated down to the efficient operating pressure range of the turboexpander, effectively delaying the conversion of the energy available in the flow into electric power. If the turboexpander were to be configured to have a higher operating pressure range, the lower end of the operating pressure range would also likely increase. Thus, as the well pressure declines, the point at which the well pressure will no longer efficiently drive the turboexpander of the electric power generation system 350 would be reached sooner in the well's life. By providing the turboexpander of the upstream electric power generation system 450 configured to operate at higher pressures, for example, the system 400 can generate more electric power by harnessing the higher pressures with the turboexpander of the electric power generation system 450. Then, as the pressures decline to the point at which the well pressure will no longer efficiently drive the turboexpander of the electric power generation system 450, the electric power generation system 450 can be isolated from the flow, and electric power generated at lower pressures with only the turboexpander of the downstream electric power generation system 452. Notably, although the system 400 is described herein with only two electric power generation systems, additional, such as three, four or more could be provided, each with a separate flow path to bypass the electric power generation system and the valves as described above, some with the separate flow path and valves as described above, or none with the separate flow path to provide bypass. Two or more in the set could be identically configured or all could be differently configured, for example, with successively lower operating ranges for each downstream electric power generation system. The turboexpander of the electric power generation systems can be configured to cooperate, alone or in cooperation with one or both of the pressure control valves in its respective bypass line, produce a pressure at the inlet to the pipeline (or upstream thereof, e.g., at the outlet of the turboexpander) that is equal to or less than the specified pressure of the pipeline. The turboexpander of the electric power generation systems can be configured to cooperate, alone or in cooperation with one or both of the pressure control valves in its respective bypass line, to maintain a temperature at the inlet to the pipeline (or upstream thereof, e.g., at the outlet of the turboexpander) at or below the specified pressure at or above the specified minimum temperature and below the specified maximum temperature. In some embodiments, there may be electric power generation systems installed in parallel to each other.

In operation, flow from the wellhead 402 is regulated down in pressure to a specified pressure by the pressure regulation valve 414. The fluid then flows through the flow conditioning system (e.g., the separator 406 and dryer 408) and is cooled by cool side of the heat exchanger 416 (transferring heat to the flow downstream in the system). If the CNG filling station is operating (i.e., isolation valve 462 is open), a portion of the flow is directed to the CNG filling station line 460 and the remainder of the flow continues on to the production path line 438. The pressure of the fluid supplied to the CNG filling station can be regulated to specified pressure by the pressure control valve 464.

In the production path line 438, the heat exchanger 416 heats the fluid (transferring heat from the flow upstream in the system). Thereafter, if the two isolation valves 432, 436 in the first flow line 422 are open, the flow is split into the first flow line 422 and second flow line 424. If one or both of the isolation valves 432, 436 are closed, the flow bypasses the first flow line 422 and continues to flow through the second flow line 424. In an instance where the flow is split between the first flow line 422 and the second flow line 424, the pressure control valve 426, pressure control valve 434 and flow control valve 428 are controlled to control the amount of flow that flows into the first flow line 422, and thus the turboexpander of the electric power generation system 450. Flow leaving the turboexpander of the electric power generation system 450 is recombined with the flow in the second flow line 424.

If both isolation valves 456, 458 in the third flow line 442 are open, the flow is split between the third flow line 442 and the fourth flow line 444. If one or both of the isolation valves 456, 458 in the third flow line 442 are closed the flow bypasses the turboexpander of the electric power generation system 452. In an instance where the flow is split between the third flow line 442 and the fourth flow line 444, the pressure control valve 446 and flow control valve 448 are operated to control the amount of flow that flows into the third flow line 442 and thus the turboexpander of the electric power generation system 452. Flow leaving the turboexpander of the electric power generation system 452 is recombined with the flow from the fourth flow line 444 and then proceeds to the inlet of the pipeline 420 at the specified pressure of the pipeline 420.

When the well is new and the production pressure is high, both turboexpanders of both electric power generation systems 450, 452 can be operated. As the well pressure declines, if the turboexpander of the electric power generation system 450 is configured to run at a higher pressure than the turboexpander of the electric power generation system 452, the pressure of flow may become too low to effectively operate the electric power generation system 450. In this case, the isolation valves 432, 436 can be closed and flow bypassed through the second flow line 424 to the electric power generation system 452. The electric power generation system 452 can thereafter continue to operate until the well pressure declines to a point at which the turboexpander of the electric power generation system 452 can no longer be effectively operated. Thereafter, the isolation valves 456, 458 can be closed and flow bypassed through the fourth flow line 444 to the pipeline 420.

Providing a numerical example, in certain instances, the pressure of the well can be initially 9,000 PSIG (62.05 MPa) or higher and the flow is regulated down to 3,600 PSIG (24.82 MPa) using the pressure control valve 414. As the well 404 ages, and the pressure declines, this 3,600 PSIG (24.82 MPa) can be maintained until the well's pressure drops below 3,600 PSIG (24.82 MPa). While the well is above 3,600 PSIG (24.82 MPa), both electric power generations systems 450, 452 can be operated to generate electricity, while also providing and maintaining a further pressure drop at or upstream of the pipeline 420 to the specified pressure of the pipeline 420. The electric power generation systems 450, 452 while also dropping the temperature at or upstream of the pipeline 420 between the maximum and minimum specified temperatures of the pipeline 420. In the example, the upstream electric power generation system 450 is configured to depressurize the 3,600 PSIG (24.82 MPa) flow to 1,600 PSIG (11.03 MPa), and so the pressure control valve 426 is also controlled to this pressure. In certain instances, the electric power generation system 450 is configured to have an isentropic efficiency at these conditions of 80% or lower. Also, in this example, the turboexpander of the downstream electric power generation system 452 is configured to receive an inlet pressure of 1,600 PSIG (11.03 MPa). In certain instances, the electric power generation system 452 is configured to have an isentropic efficiency at these conditions of 80% or lower. As the well 404 pressure drops below 3,600 PSIG (24.82 MPa), the efficiency of the turboexpander of the upstream electric power generation system 450 drops off until the well conditions can no longer operate the turboexpander sufficiently. Thereafter the first flow line 422 is shut off by closing the isolation valves 432, 436 and flow is only directed through the second flow line 424. But, the second electric power generation system 452 continues to operate with the pressure control valve 426 (or optionally the pressure control valve 414) maintaining pressure to the third flow line 442 and fourth flow line 444 at 1,600 PSIG (11.03 MPa). As the well 404 pressure drops below 1,600 PSIG (11.03 MPa), the efficiency of the turboexpander of the downstream electric power generation system 452 drops off until the well conditions can no longer operate the turboexpander sufficiently. Thereafter, the third flow line 442 is shut off by closing isolation valves 456, 458 and flow is directed through only the fourth flow line 444, so that the turboexpander does not provide an additional pressure drop. In certain instances, the turboexpander of the downstream electric power generation system 452 is configured to produce usable amounts of electricity until the pressure upstream approaches the pipeline's specified pressure. Often times, this specified pressure is 1000 PSIG (6.89 MPa).

In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. A system for cooling flow from a gas well prior to a production pipeline, comprising:
    an inlet flow line coupled to a wellhead of the gas well to receive gas produced from the gas well; and
    a flow line coupled to the inlet flow line to receive the gas and coupled to the production pipeline to direct the received gas away from a production site, the flow line residing at the production site and comprising an electric power generation system,
    the electric power generation system comprising:
        a turbine wheel configured to receive the gas and rotate in response to expansion of the gas flowing into an inlet of the turbine wheel and out of an outlet of the turbine wheel,
        a nozzle configured to direct the gas into the inlet of the turbine wheel,
        an electric rotor coupled to the turbine wheel and configured to rotate with the turbine wheel, and
        a stationary electric stator, the electric rotor and electric stator defining an electric generator configured to generate current upon rotation of the electric rotor within the electric stator, and
        the turbine wheel configured to reduce the temperature of the received gas at an inlet to the production pipeline to at least a specified temperature associated with the production pipeline.

2. The system of claim 1, where a pressure of the flow from the gas well is expected to decline from an initial pressure over the operating life of the well, and where the nozzle and the turbine wheel characteristics are selected, based on the expected decline, to maintain a temperature of the received gas at the inlet to the production pipeline to be above the specified temperature while the well is producing gas above a specified maximum pressure associated with the production pipeline.

3. The system of claim 1, where the specified temperature is a specified maximum temperature for gas supplied to the production pipeline.

4. The system of claim 1, where the nozzle and the turbine wheel are configured to reduce the temperature of the received gas to 38° C. or lower.

5. The system of claim 4, where the turbine is configured to reduce the temperature of the received gas while maintaining the temperature above a hydrate formation temperature of the gas at the outlet of the turbine wheel.

6. The system of claim 5, where there is no heater between the turbine wheel and the production pipeline.

7. The system of claim 1, comprising a second flow line coupled to the inlet flow line to receive the gas and provide an alternate flow path for the gas around the first mentioned flow line, the second flow line comprising a pressure control valve, and where the first mentioned flow line and the second flow line are coupled downstream of the electric power generation system to recombine flow from the first mentioned flow line and the second flow line.

8. The system of claim 7, where the nozzle and the turbine wheel are configured to, in cooperation with the pressure control valve in the second flow line, maintain a temperature of the received gas at the inlet to the production pipeline to be above a specified minimum temperature associated with the production pipeline while the well is producing gas above a specified maximum pressure associated with the production pipeline.

9. The system of claim 8, where the nozzle and turbine wheel are configured to, in cooperation with the pressure control valve in the second flow line, maintain a pressure of the received gas at the inlet to the production pipeline to be below the specified maximum pressure associated with the production pipeline.

10. The system of claim 8, where the nozzle and the turbine wheel characteristics are selected to maximize the amount of power produced by the electric power generation system while, in cooperation with the pressure control valve in the second flow line, maintaining the temperature of the received gas at the inlet to the production pipeline above the specified minimum temperature while the well is producing gas above the specified maximum pressure associated with the production pipeline.

11. The system of claim 1, comprising a hermetically sealed housing, hermetically sealed from an inlet of the electric power generation system to an outlet of the electric power generation system, the hermetically sealed housing enclosing the turbine wheel, the electric rotor, and the electric stator and hermetically sealed inline in the first mentioned flow line so that received flow flows through the turbine and over the electric stator.

12. The system of claim 1, where the electric rotor comprises a permanent magnet rotor.

13. The system of claim 1, comprising a flow control valve in the flow line upstream of the electric power generation system.

* * * * *